United States Patent [19]
De Corlieu et al.

[11] Patent Number: 4,723,310
[45] Date of Patent: Feb. 2, 1988

[54] DIGITAL DATA TRANSMISSION SYSTEM BY COHERENT LIGHT WAVE MODULATION

[75] Inventors: Guy De Corlieu, Paris; Léon Robin, Massy, both of France

[73] Assignee: Thomson-CSF, Paris, France

[21] Appl. No.: 670,055

[22] Filed: Nov. 9, 1984

[30] Foreign Application Priority Data

Nov. 10, 1983 [FR] France .................................. 83 17914

[51] Int. Cl.$^4$ .............................................. H04B 9/00
[52] U.S. Cl. ...................................... 455/608; 375/48; 455/611; 455/615; 455/617
[58] Field of Search ................. 370/1, 3, 110.2, 110.3; 455/608, 611, 615, 617; 375/45, 48, 62, 66, 88, 89; 364/726, 827

[56] References Cited

U.S. PATENT DOCUMENTS

| | | | |
|---|---|---|---|
| 3,330,909 | 7/1967 | Willson | 375/48 |
| 3,485,949 | 12/1969 | Haas | 375/48 |
| 3,906,366 | 9/1975 | Minami et al. | 455/608 |

OTHER PUBLICATIONS

Faure et al–"Progress Towards Heterodyne"–IEEE Jour. of Quantum Electronics–vol. QE-17 No. 6, Jun. 1981, pp. 897–905.
Chadwick–"The Design of a Low Data Rate MSFK"–IEEE Trans. on Comm. Tech.–vol. Com.-18–No. 6, Dec. 190–pp. 740–750.
ICC '83 Conference Record of the IEEE International Conference on Communications, vol. 3, 19–22, Jun. 1983, IEEE, Boston (US). V.W.S. Chan et al, "Heterodyne Lasercom Systems using GaAs Lasers for ISL Applications", pp. El.5.7.
IEEE Transaction on Aerospace and Electronic Systems, vol. AES-8, No. 1, Ja. 1972, New York (US), G. A. McKay "Noncoherent Detection of Split-Phase FSK by Multiple Predection Filtering" pp. 51–63.
IEEE Transaction on Communication Technology, vol. COM-16, No. 5, Oct. 1968, New York (US), N. J. Ferguson: "Communication at Low Data Rates-Spectral Analysis Receivers" pp. 657–668.

Primary Examiner—Joseph A. Orsino, Jr.

[57] ABSTRACT

A digital data transmission system by modulating a coherent light wave is provided using modulation of the MSFK type with N frequencies for modulating the light wave. The transmitter comprises a coherent light source, a modulator, an output optical means and an MSFK modulation signal generator. The receiver comprises an input optical means, local light wave source and a heterodyne mixer for creating an electric signal of intermediate frequency. A demodulation and detection circuit comprises filtering means for separately selecting the N frequencies before detection. A processing cirucit puts the data back into its initial form. A circuit for compensating for the drift of the light sources is used for preserving lock on to the intermediate frequency.

4 Claims, 13 Drawing Figures

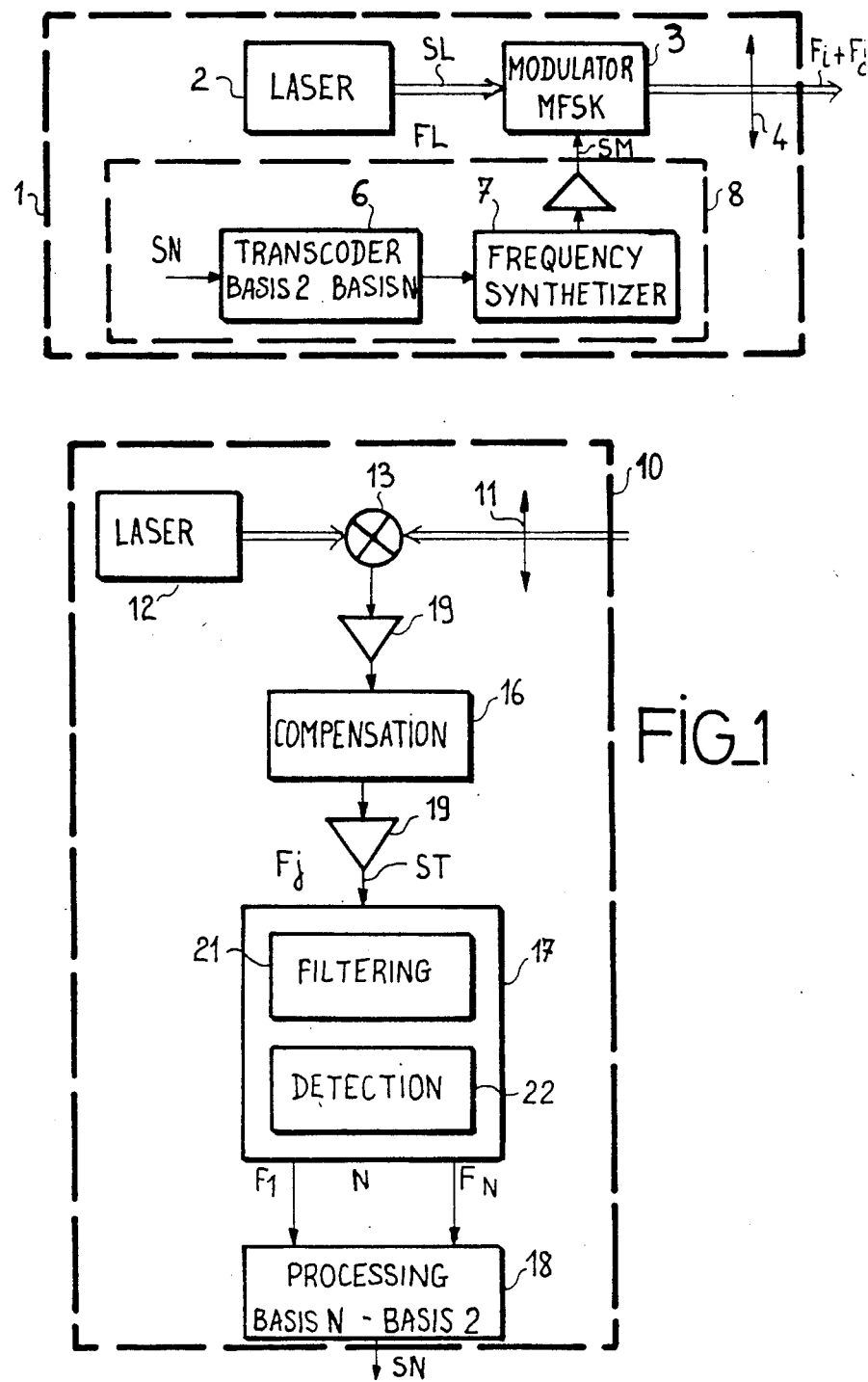

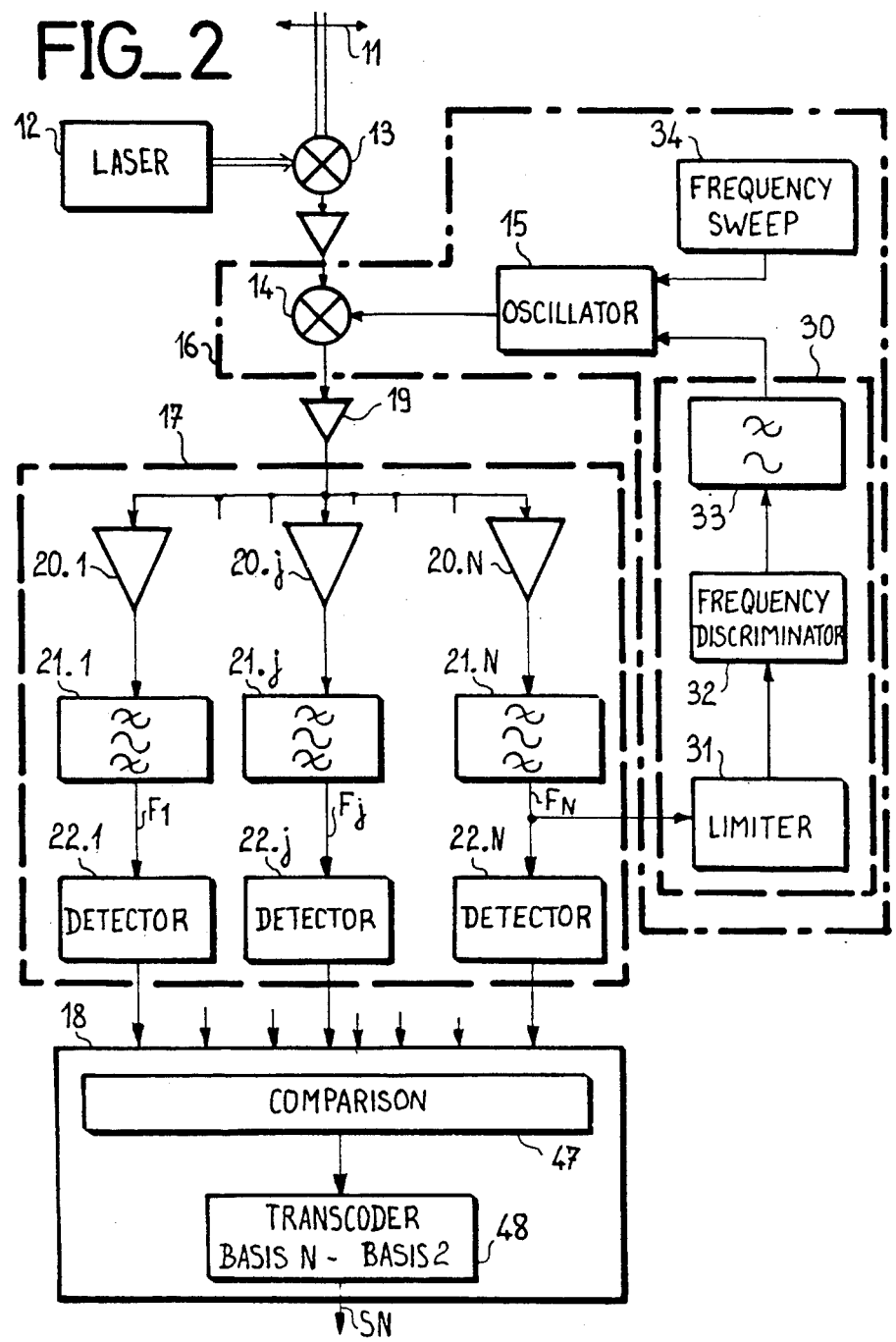

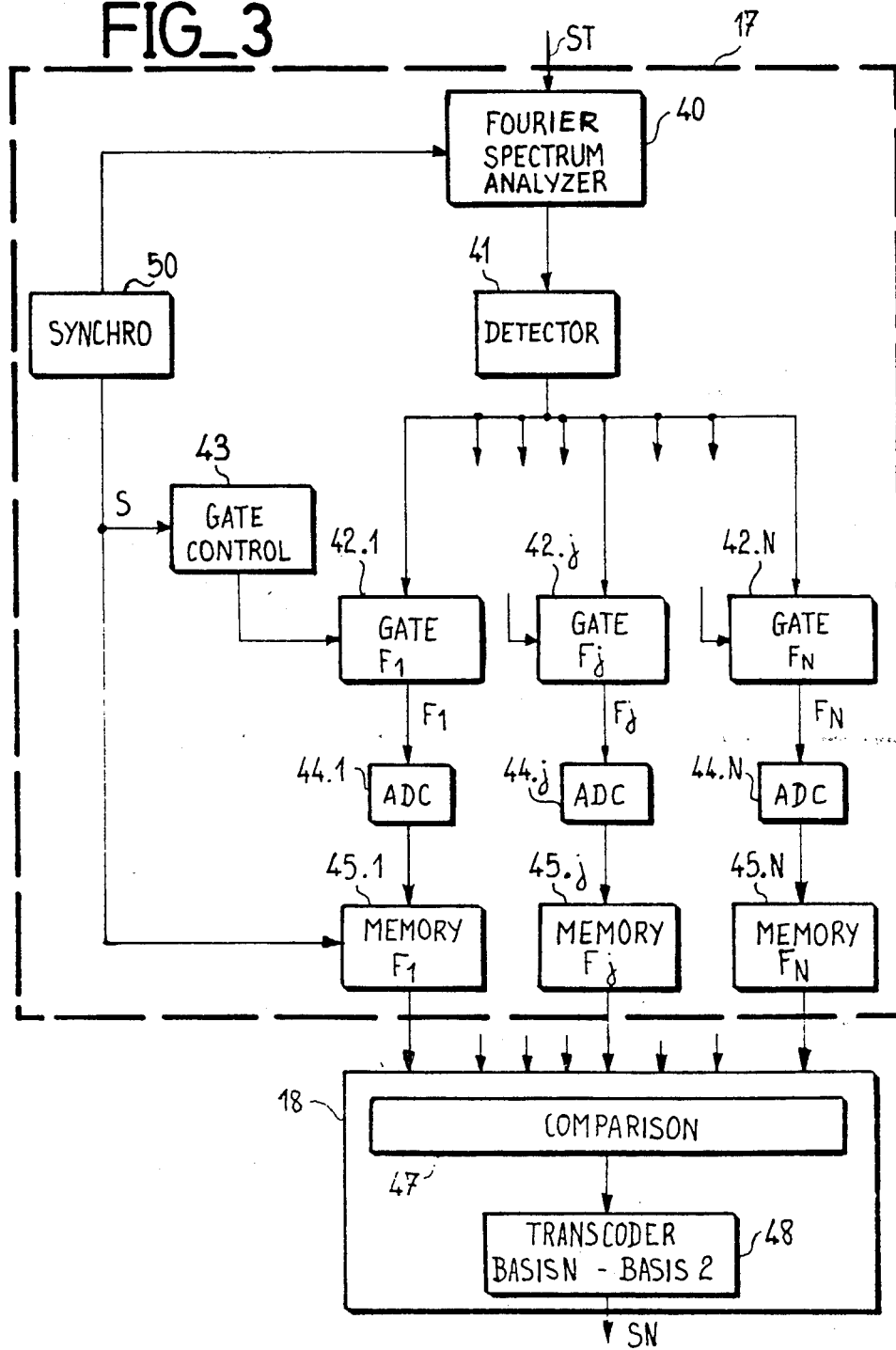

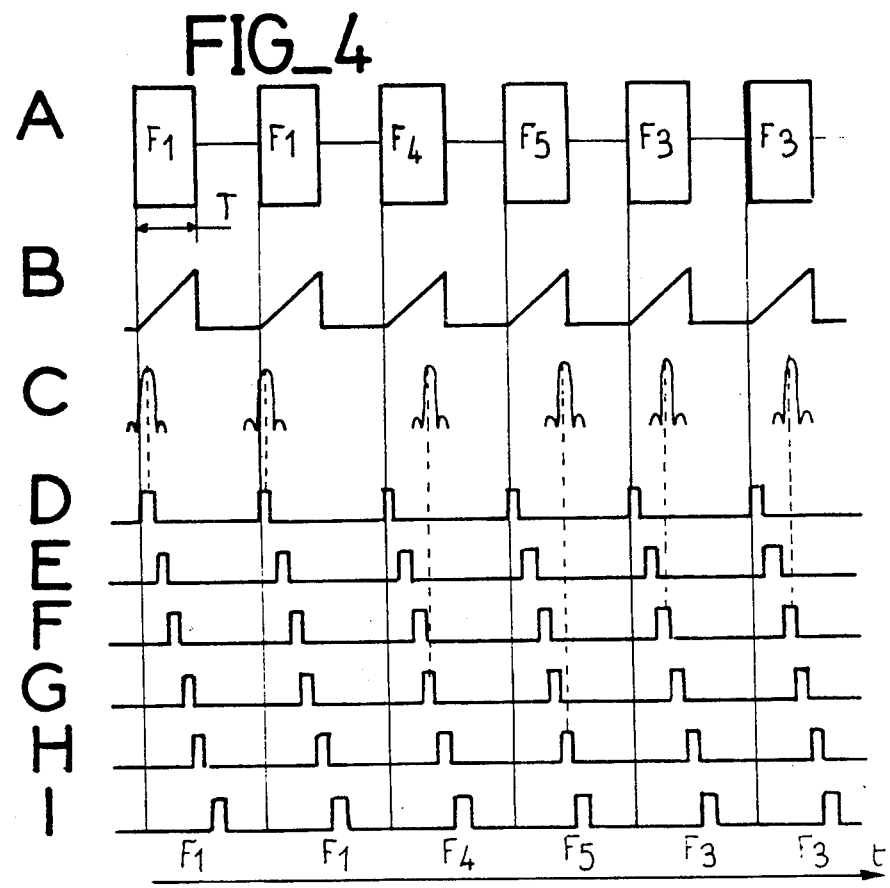
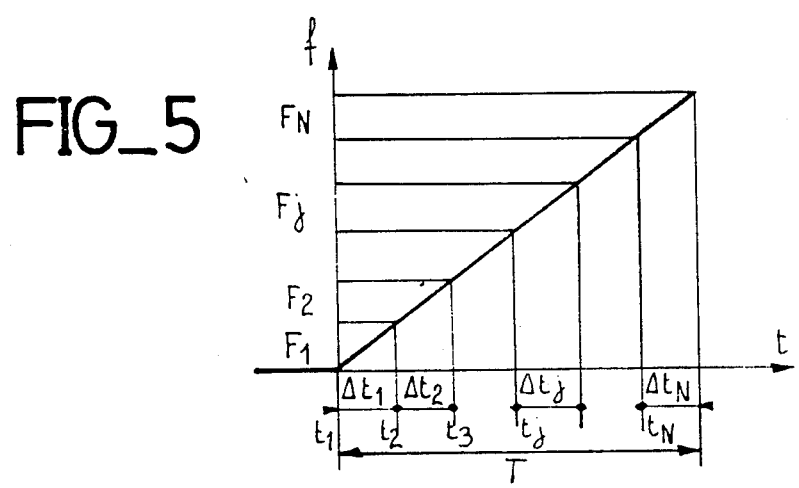

DIGITAL DATA TRANSMISSION SYSTEM BY COHERENT LIGHT WAVE MODULATION

BACKGROUND OF THE INVENTION

1. Field of the Invention

The present invention relates to digital data transmission systems using coherent light wave modulation and the construction of such systems using modulation of the frequency shift type. Use thereof is more particularly envisaged for ground-air or air-air links.

Generally, such a system uses a laser generator for producing a first coherent light wave on emission; this wave is frequency modulated on each side of a mean value $F_E$ by a modulator receiving a modulation signal translating the information to be transmitted. On the reception side, the system uses a photo-mixer for mixing the wave received with a local coherent light wave so as to provide an electric beat signal at an intermediate frequency. Processing circuits then demodulate the beat signal.

2. Description of the Prior Art

Digital data transmission techniques are also known using radio electric waves. The message may be translated by two symbols; this is the case of frequency shift modulation of the FSK type (frequency shift keying). The message may also be translated on an N basis by a succession of symbols chosen from an alphabet with N elements designated by the figures from 1 to N, N being greater than 2. This is the case of frequency shift modulation of the MFSK type (multiple frequency shift keying). Each state to be transmitted is characterized by a frequency; the figure 1 corresponds to a frequency $F_1$, the figure 2 to a different frequency $F_2$ and so on up to figure N corresponding to a frequency $F_N$.

If coding of the data is of the binary type, only two symbols are available. This is the case with the FSK system where P successive data are required for translating the number $2^P - 1$, for example 6 figures for translating the number 63 which is equivalent to $2^6 - 1$ which is written 111111 in binary code. In the case of data coding with N symbols available, N being greater than 2, Q successive data are required for translating the $N^Q - 1$, for example on an 8 basis with N=8 different symbols only two data are required for writing the number 63. With such a code a greater amount of data may thus be transmitted than with a binary code for the same number of figures.

Data transmission systems using modulation of the type with frequency shifting of a non luminous radio electric wave do not allow a greater number of frequencies to be used, the frequency of the carrier wave being of the order of 100 MHz. The frequency band which may be used with a light wave of smaller wave length allows a greater number of frequencies to be used, the frequency of the carrier wave being of the order of $10^7$ MHz. Now these waves are much rarer than those whose frequencies are of the order of 100 MHz, and the risks of jamming are therefore greatly reduced. Advantage may be taken of the high directivity of the laser wave beam.

The aim of the invention is to provide a high flow digital data transmission system, using the optical path as transmission medium and a modulation signal of the MFSK type for translating the information.

SUMMARY OF THE INVENTION

The invention provides then a digital data transmission system using modulation of a coherent light wave, comprising on the emission side of coherent light emitter, a modulator for modulating said wave with a modulation signal, an output optical means and a generator transforming the information to be transmitted into said modulation signal, depending on the modulation to be effected, the system comprising on the reception side an input optical means, a heterodyne mixer for creating a beat of said wave with a local coherent light wave and obtaining an electric signal of intermediate frequency, a demodulation and a detection circuit for restoring said information, wherein the modulation signal is formed from a plurality N of different frequencies for producing modulation of the MSFK type and translating each information to be transmitted in digital form in an N based system, the demodulator comprising filtering means for separately selecting the N frequencies before detection.

BRIEF DESCRIPTION OF THE DRAWINGS

The features and advantages of the invention will be clear from the following description, given by way of example and illustrated by the figures which show:

FIG. 1, a diagram of the transmission system of the invention;

FIG. 2, a diagram of a first embodiment of the demodulation and detection circuit;

FIG. 3, a diagram of a second embodiment of the demodulation and detection circuit;

FIGS. 4a to 4i and 5, wave forms relative to the operation of the demodulation circuit of the second embodiment.

DESCRIPTION OF THE PREFERRED EMBODIMENTS

With reference to FIG. 1, the emitter assembly 1 receives the data to be transmitted, for example in the form of video signals SN. A coherent source 2 such as a laser emitter delivers a coherent wave SL of given frequency $F_L$ and comprises for this its own stabilizing means.

A modulator 3 receives the laser wave SL and modulation signals SM corresponding to a given number N of separate frequencies $F_1$ to $F_N$, so as to provide MSFK modulation. The output signal of the modulator is a light wave of mean frequency $F_L$ formed from successive pulses of frequency $F_L + F_j$, $F_j$ having any one of N values $F_1$ to $F_N$. The modulator is preferably of the acousto-optical type. The modulated wave is transmitted to an appropriate optical transmission system, for example a catadioptric optical system of the Cassegrain type, which forms a beam with given divergence.

The video signal SN to be transmitted is applied in digital form to a generator 8 of the modulation signal SM through an analog-digital converter. The output of the converter is connected to the input of a transcoder 6. If, as the case may be, it is a digital signal SN which is supplied to the emitter assembly 1, this signal is applied directly to the transcoder. This latter causes a digital signal of an N basis writing system, i.e. with N different symbols, to correspond to the digital signal SN, considered in binary form. With each combination of P binary data it associates a combination of Q data chosen from N symbols such that $2^P = N^Q$. For example, if N=8 and P=6, this combination of 6 symbols is replaced by one of two. The output of the transcoder 6 is connected to the input of a frequency synthetizer 7, which associates a given distinct frequency with each of the N symbols. Its output delivers the modulation signal SM ready to be used for modulating the laser wave SL, after having possibly passed through one or more amplification stages.

The receiver assembly 10 comprises first of all an optical reception system 11 whose axis is orientated towards the emitter. A laser source 12 of the same wave length as that used on emission, provides heterodyne mixing and allows an electric signal ST at an intermediate frequency to be produced by a beat phenomenon. It is formed from a photo-mixer 13 such as a wide band mixer crystal.

The intermediate frequency signal is then applied, before demodulation, to a drift compensation circuit 16 for preserving lock on to the intermediate frequency.

The intermediate signal passes through one or more amplification stages and is applied to a demodulating and detecting circuit 17. This latter comprises filtering means 21 for selecting the N frequencies $F_1$ to $F_N$ of the intermediate signal ST. All the pulses transmitted at a given frequency $F_j$ are routed to a corresponding channel and detected at 22, for each of the N frequencies. The N channels are connected to a processing circuit 18. This latter decodes the message transmitted, it comprises a transcoder which puts the message back into binary form SN so as to facilitate use thereof.

The processing circuit 18 and the drift compensation circuit 30 will now be described at the same time as a first embodiment of the demodulator.

Referring to FIG. 2, the intermediate signal passes through the wide band amplifiers 19 covering the range of values $F_1$ to $F_N$ (the middle of this range may be considered as intermediate central frequency). The signal is then applied simultaneously to N detection channels, each one being associated with one of these frequencies $F_1$ to $F_N$. Each channel comprises a drive amplifier 20.1 to 20.N followed by a band pass filter 21.1 to 21.N. Each of these filters only lets through one of these frequencies used for transmitting the data, in this case the one assigned to this channel. Each channel ends in an envelope detector 22.1 to 22.N which delivers a signal in the presence of pulses having the characteristic frequency of the channel. The N outputs of these detectors are applied to the input of the processing circuit 18. This latter, at the order of each timing pulse S, reads the contents of each memory and selects by means of a comparison circuit 47 in the intermediate frequency signal, the frequency of the pulse of the detected amplitude is very likely to be that of the pulse transmitted between the transmitter and the receiver.

The successively detected values are applied to the input of a transcoder 48 which transforms this MSFK digital data into a binary digital signal, for example NRZ (non return to zero). If for example, the number of frequencies used is eight, coding of the information is carried out on the basis of eight on the transmission side. Decoding on the reception side must take place from basis 8 to basis 2. If we have 500 different data likely to be transmitted, words of 9 binary pulses may be used for $S^9=512<500$. For basis 8, only three successive pulses will be used for $8^3=512$. The words thus formed may be separated by periods during which no pulse is transmitted or on the contrary the given frequency is transmitted a given number of times for distinguishing the beginning and the end of the words to be decoded.

The transmission system of the invention is used for connections between stations which may have relative mobility with respect to each other. Variations of the distance between two stations give rise to a Doppler shift. Provision is therefore made for compensating for this drift and other possible drift by means of the compensation circuit 16 (FIG. 1).

The compensation circuit 16 is not the main object of the invention but is however necessary. It comprises a single side band mixer 14 which also receives the output of a local voltage controlled oscillator 15 of VCO. It is controlled by a frequency sweep circuit 34 during a preliminary acquisition phase. Then, it provides reintegration of the signal from a servo controlled circuit 30 which automatically compensates for the drifts of lasers 2 and 12 and the shift of the signal due to the Doppler effect.

The servo control circuit may be formed by connecting in series, from a channel, a limiter amplifier 31, a frequency discriminator 32 and a filtering and matching network (or integrator) 33 which delivers the fine control of frequency lock on of the local oscillator 15.

The second embodiment of the demodulating and detecting circuit 17, illustrated in FIG. 3, is as follows. After having passed through amplification stages, the intermediate frequency signal ST (FIG. 4a) is applied to the input of a high speed Fourier spectrum analyzer 40 which forms the filtering means. This analyzer is controlled by a bit synchronization circuit 50 at the timing of the transmitted pulses and in phase with reception thereof. At each timing pulse S, the ramp generator, included in the analyzer 40, is triggered (FIG. 4b). The output of the analyzer is connected to the input of a single envelope detector 41 for detecting the presence of the different pulses. The output of the detector (FIG. 4c) is applied to N channels, each corresponding to one of the modulation frequencies used. Considering the wave form of FIG. 5, the ramp of the analyzer lasts for a period T during which the analyzer scans the range of N frequencies. This scanning begins by frequency $F_1$ at time $t_1$ and ends with frequency $F_N$ during the time $t_N$. Each channel comprises a gate 42.1 to 42.N whose opening is controlled by a gate control circuit 43 for a short period of time $\Delta t_j$ at time $t_j$. This control circuit may be formed by counters receiving a second timing signal of period T/N and each triggering the opening of a gate after counting a given number of bits.

Referring to FIGS. 4d to 4H, this circuit drives gates 42.1 to 42.N in staggered fashion so that each gate is only open when scanning of the ramp is at the level of the frequency which corresponds to it. In other words, if the detector detects a frequency pulse $F_j$, the gate which is open at that precise time $t_j$ is $42_j$, corresponding to the frequency $F_j$ of the pulse. An analog-digital converter 44.1 to 44.N puts the amplitude of the pulse into binary form which is then stored in a memory 45.1 to 45.N reserved for storing pulses of a frequency corresponding to that of the channel. The processing circuit 18, identical to the one described in the first embodiment, reads the contents of the memories at the bit rate (FIG. 4i).

Bringing the bit synchronization circuit 50 into phase requires an acquisition period during which a pulse sequence of the same frequency at the bit rate is emitted as preamble to the message.

The pass band of filter 33 of the servo control circuit 30 must be matched to the possible drifts of the local laser source 12 and to the frequency variations due to the Doppler effect created by the relative shift of the transmitter assembly with respect to the receiver assembly. If these variations are appreciable and are occurring at high speed, the pass band must be fairly wide for the compensation circuit to be able to act rapidly and accurately without losing contact with the frequency.

The wave length chosen for the laser source is preferably 10.6 microns for it provides a very coherent light wave.

What is claimed is:

1. A digital data transmission system using coherent light wave modulation comprising on the emission side:
   a coherent light emitter for emitting a light wave;
   means for translating each data to be transmitted into digital form in a N based system;
   said translating means comprising a generator including a transcoder for receiving said data and a frequency synthesizer connected to the output of said transcoder for providing a modulation signal;
   a modulator for modulating said light wave by means of said modulation signal formed from a plurality N of different frequencies for producing modulation of the MSFK type to provide a modulated light wave;
   an output optical means for transmitting said modulated light wave;
the system comprising on the reception side:
   an input optical means for receiving said wave;
   a heterodyne mixer for creating a beat of said wave with a local coherent light wave and obtaining an electric signal of intermediate frequency;
   a combined demodulation and detection circuit for restoring said data from said mixer, comprising: a bit synchronization circuit supplying a timing signal and filtering mens for separately selecting the N frequencies from said signal of intermediate frequency before detection, said filtering means being a high speed spectrum analyzer for receiving the signal of intermediate frequency for analyzing the same at the rate of said timing signal, an envelope detector connected to the output of said analyzer, the output of the detector being connected to the input of a number of channels, equal to said number N of frequencies, each channel comprising a gate driven by a gate control circuit at the rate of said timing signal, the gates being open, each one at the time when said analyzer produces the frequency corresponding to said gate, the output of each of said gates being applied to the input of a corresponding memory which is read at the rate of said timing signal, and
   a processing circuit for decoding the transmitted message into a useful form.

2. The transmission system as claimed in claim 1, wherein said processing circuit comprises a comparison circuit for comparing the contents of all the memories in synchronization at the rate of the timing signal so as to keep only the signal with the largest amplitude.

3. The transmission system as claimed in claim 1 including a drift compensation circuit for receiving the intermediate frequency signal, said drift compensation circuit comprising a local oscillator, a side band mixer and a servo control circuit for compensating for the drifts of the light emitter by controlling said local oscillator whose output signal is mixed with said intermediate frequency signal by said side band mixer and including a frequency scanning circuit for controlling said oscillator during an acquisition phase.

4. The transmission system as claimed in claim 3, used for linking two stations together, each of said stations having relative mobility with respect to each other.

* * * * *